US012202714B2

(12) United States Patent
Laukkanen et al.

(10) Patent No.: US 12,202,714 B2
(45) Date of Patent: Jan. 21, 2025

(54) ROPE DRUM OF ROPE HOIST AND FASTENING DEVICE OF HOISTING ROPE

(71) Applicant: Konecranes Global Corporation, Hyvinkaa (FI)

(72) Inventors: Niko Laukkanen, Hyvinkää (FI); Teppo Lindberg, Hyvinkää (FI); Henri Kokko, Hyvinkää (FI); Mikko Jutila, Hyvinkää (FI)

(73) Assignee: KONECRANES GLOBAL CORPORATION, Hyvinkaa (FI)

( * ) Notice: Subject to any disclaimer, the term of this patent is extended or adjusted under 35 U.S.C. 154(b) by 243 days.

(21) Appl. No.: 17/906,819

(22) PCT Filed: Mar. 23, 2020

(86) PCT No.: PCT/FI2020/050182
§ 371 (c)(1),
(2) Date: Sep. 20, 2022

(87) PCT Pub. No.: WO2021/191489
PCT Pub. Date: Sep. 30, 2021

(65) Prior Publication Data
US 2023/0146376 A1 May 11, 2023

(51) Int. Cl.
*B66D 1/30* (2006.01)
*B66D 1/14* (2006.01)
*B66D 1/34* (2006.01)

(52) U.S. Cl.
CPC .................................... *B66D 1/34* (2013.01); *B66D 1/14* (2013.01)

(58) Field of Classification Search
CPC ... B66D 1/34; B66D 1/14; B66D 1/30; B66D 1/36
See application file for complete search history.

(56) References Cited

U.S. PATENT DOCUMENTS

2003/0168551 A1* 9/2003 Golden .................. B65H 75/28 242/587
2015/0097148 A1* 4/2015 Wiley ...................... B66D 1/34 254/266

(Continued)

FOREIGN PATENT DOCUMENTS

CN 201729616 U 2/2011
CN 108975193 A * 12/2018

(Continued)

OTHER PUBLICATIONS

Korean Office Action for Korean Application No. 10-2022-7036478, dated Jun. 16, 2024, with English translation.

*Primary Examiner* — Emmanuel M Marcelo
(74) *Attorney, Agent, or Firm* — Birch, Stewart, Kolasch & Birch, LLP

(57) ABSTRACT

The invention relates to a rope drum of a rope hoist, the rope drum having a drum cover for winding a hoisting rope around it, a power transmission member at an end of the drum cover for driving the rope drum, and a fastening device for fastening an end of the hoisting rope to the rope drum. The fastening device is fastenable on an area between the end surfaces of the rope drum, close to an end of the rope drum and protruding from its surface, and mainly comprises a cylindrical gripping part for installing a spliced rope loop of the hoisting rope around it, and a fastening protrusion arranged to extend from the cylindrical gripping part over the end of the rope loop and simultaneously forming a space partly enclosing the end of the rope loop.

14 Claims, 4 Drawing Sheets

(56) References Cited

U.S. PATENT DOCUMENTS

| | | | | |
|---|---|---|---|---|
| 2015/0284230 | A1* | 10/2015 | Hall | B66D 1/12<br>254/356 |
| 2018/0118532 | A1* | 5/2018 | Worswick | B66D 1/34 |
| 2021/0221660 | A1* | 7/2021 | Every | E02F 9/2016 |

FOREIGN PATENT DOCUMENTS

| | | | | | |
|---|---|---|---|---|---|
| CN | 109368527 | A | * | 2/2019 | B66D 1/34 |
| CN | 116332072 | A | * | 6/2023 | |
| DE | 102015012819 | A1 | * | 4/2017 | B66D 1/30 |
| EP | 0139151 | A2 | | 2/1985 | |
| EP | 1528031 | A1 | * | 5/2005 | B66D 1/34 |
| EP | 3 459 901 | A1 | | 3/2019 | |
| GB | 918872 | A | | 2/1963 | |
| JP | 63-10078 | B2 | | 3/1988 | |
| JP | H0286993 | U | | 7/1990 | |
| KR | 10-2004-0033381 | A | | 4/2004 | |
| WO | 2017058978 | A1 | | 4/2017 | |

* cited by examiner

ROPE DRUM OF ROPE HOIST AND FASTENING DEVICE OF HOISTING ROPE

BACKGROUND OF THE INVENTION

The invention relates to a rope drum of a rope hoist, the rope drum having a drum cover for winding a hoisting rope around it, a power transmission member at an end of the drum cover for driving the rope drum, and a fastening device for fastening an end of the hoisting rope to the rope drum. The invention additionally relates to said fastening device.

There may be problems is fastening a hoisting rope to a rope drum in particular when a synthetic hoisting rope is used. A synthetic rope is very slippery, which means that implementing a firm fastening is difficult and makes the fastenings complicated.

A known fastening implementation of a synthetic hoisting rope is one where the hoisting rope is fixed with a plurality of bolt fasteners on an outer surface of a flange arranged at an end of a rope drum, from where the hoisting rope is guided, through a hole in the flange, onto a drum cover of the rope drum. The implementation is fairly complicated and is only suited to a very limited type of rope drums, because the goal as concerns rope drums, for example, is a compact structure which sometimes leaves no room in this area.

A second known method of implementing the fastening of a synthetic hoisting rope is to run the hoisting rope through the drum cover and fasten it with special clamps inside the rope drum. The holding of this fastening is ques-tionable and most difficult from the point of view of installation and maintenance. In addition, if the fastening mechanism develops a fault and falls inside the drum cover, it may break the rope drum itself and structures within it.

SUMMARY OF THE INVENTION

The object of the invention is to solve the problems described above. The object is achieved with the rope drum according to the invention, which is characterised in that the fastening device is fastenable on an area between the end surfaces of the rope drum, close to an end of the rope drum and protruding from its surface, and mainly comprises a cylindrical gripping part for installing a spliced rope loop of the hoisting rope around it, and a fastening protrusion arranged to extend from the top part of the cylindrical gripping part over the end of the rope loop and simultaneously forming, with the gripping part and rope drum periphery, a space partly enclosing the end of the rope loop, the fastening protrusion extending transversely in relation to the axis of the rope drum in the opposite direction than the hoisting rope and comprising a fastening area for fastening to the rope drum. The fastening device is characterised by what is stated in claim 13. Preferred embodiments of the invention are disclosed in the dependent claims.

The idea of the invention is to bring the fastening of the hoisting rope on the rope drum of a hoisting apparatus so that the holding of the fastening is secured straight to the machinery producing rotational torque. The goal is to transfer the force caused by loading on the hoisting rope as reliably as possibly directly to the machinery running the rope drum. In the inventive arrangement, bolt or similar joints used to fasten the hoisting rope are not subjected to a shearing stress. Because there is a retaining pin directly connected to the power transmission member transmitting the driving force, also interlocking the power transmission member and drum cover, the power transmission capability of another joint between the power transmission member and drum cover, such as a press fit, is not exclusively dependent on the press fit.

Generally speaking, the aim is to minimize the chance of parts getting damaged or division surfaces slipping, through which the hoisting power of the hoisting rope is established on the periphery of the rope drum when the driving machinery is supplying rotational torque for the drum. By means of the fastening method of the invention, the fastenings of the rope loop or ring on the outer surface of a drum cover, such as to bolt joints, may be implemented in such a manner that the bolts are not subjected to a shear stress. In addition, some security is achieved against the drum cover cracking.

LIST OF FIGURES

In the following, the invention will be described in greater detail with reference to the accompanying drawings, in which FIG. 1 shows the half or end of the inventive rope drum, on which the inventive fastening device is installed;

DETAILED DESCRIPTION OF THE INVENTION

Figure 1:
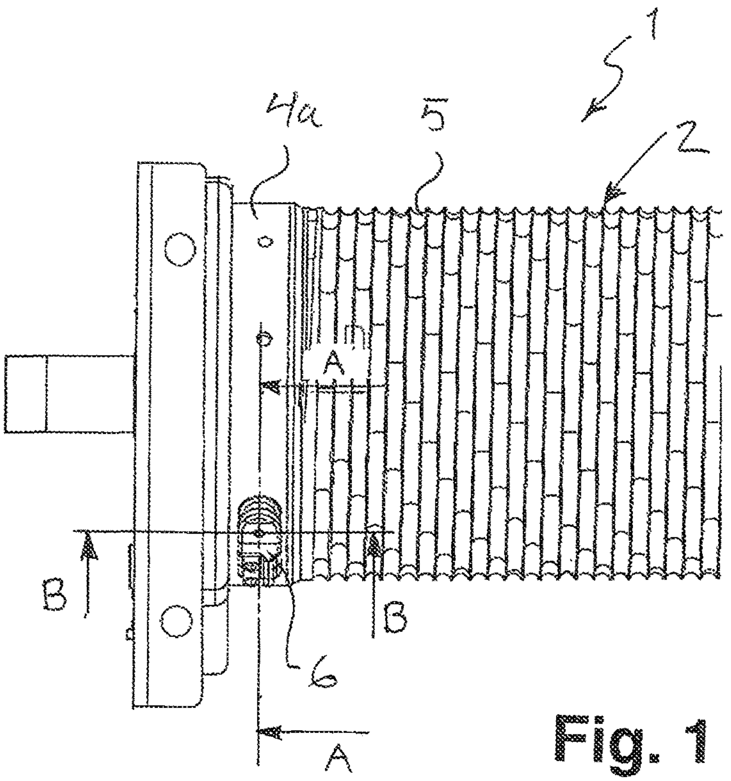
Figure 2:
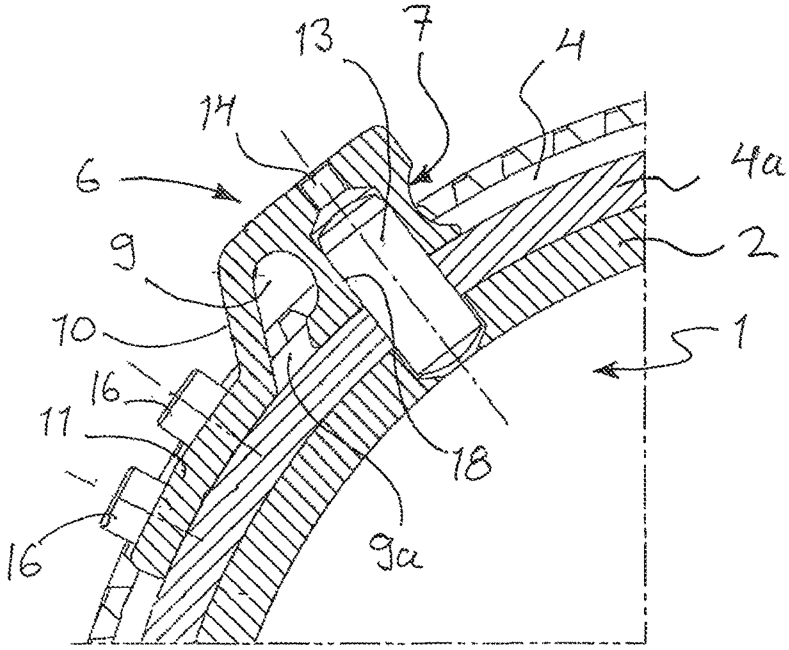
FIG. 2 is a cross-section along line A-A of FIG. 1.
Figure 3:
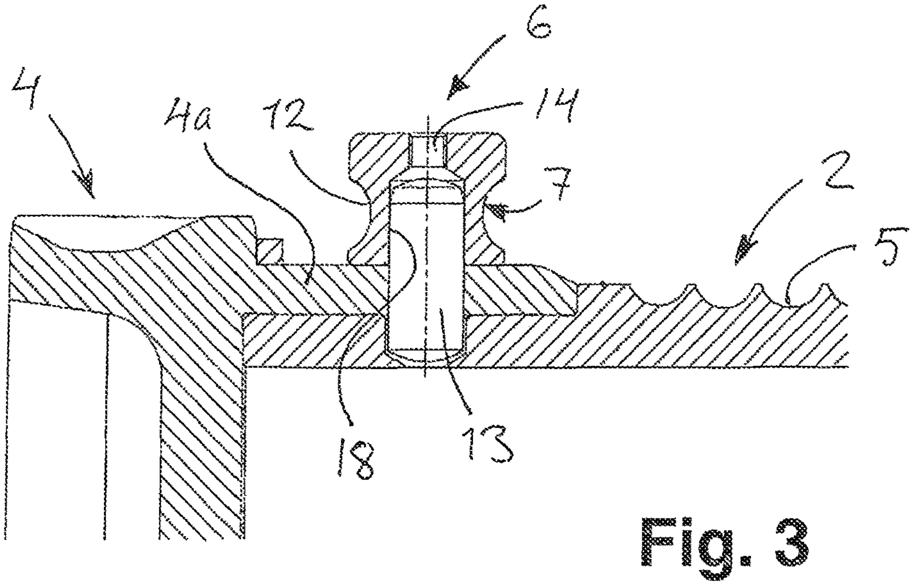
FIG. 3 is a cross-section along line B-B of FIG. 1.
Figure 4:
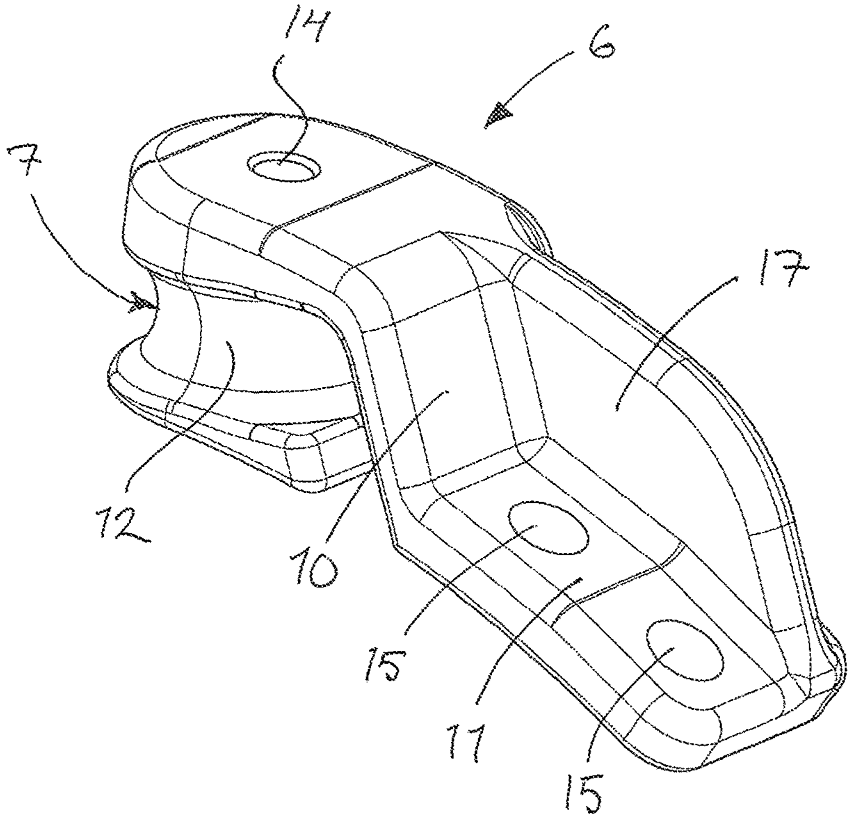
FIG. 4 shows the inventive fastening device as a perspective view and shown separately.
Figure 5:
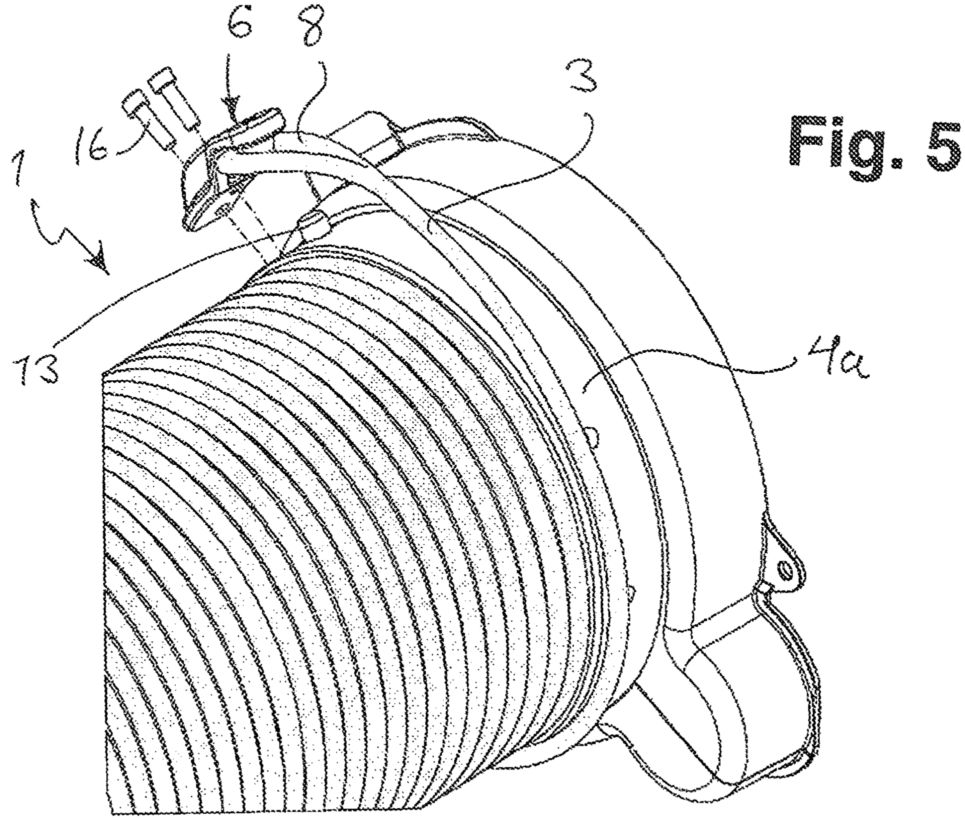
FIG. 5 is a perspective view of the fastening device shown in the previous figures when it is being installed in place with a rope loop of the hoisting rope.
Figure 6:
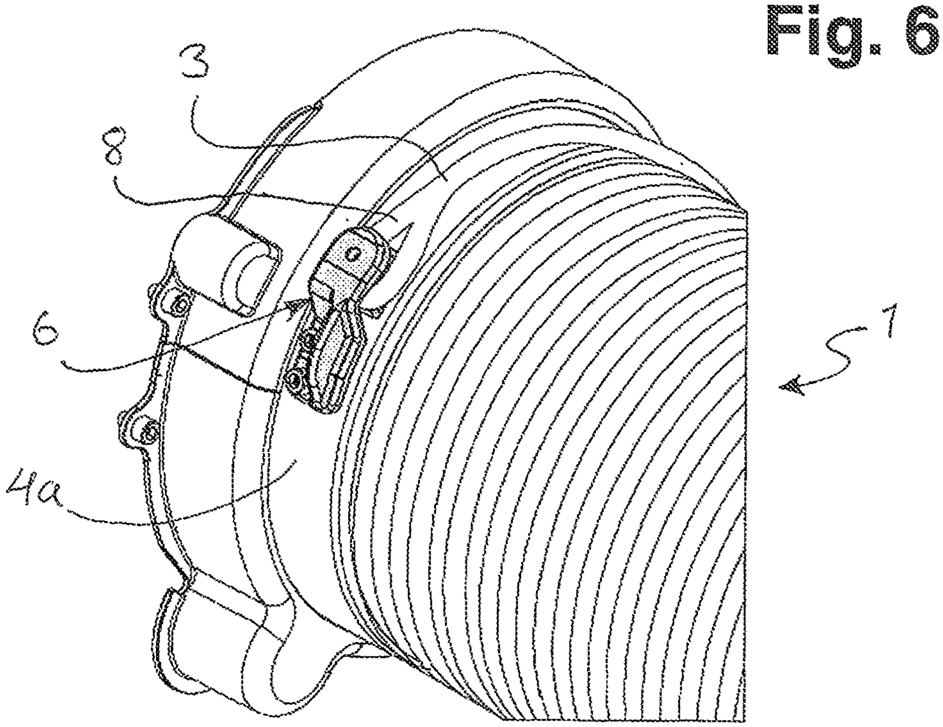
FIG. 6 is a perspective view of the fastening device shown in the previous figures when it has been installed in place with a rope loop of the hoisting rope.

Referring to FIGS. 1 to 6 of the accompanying drawings, shown is an inventive rope drum 1 of a rope hoist, having a drum cover 2 for winding a hoisting rope 3 around it, a gearwheel 4 at one end of the drum cover 2 for driving the rope drum 1, and a fastening device 6 for fastening an end of the hoisting rope to the rope drum 1. In this application, the gearwheel 4 refers to a power transmission member connected to an end of the drum cover 2 of the rope drum 1, which member may have a toothed surface as an internal or external toothed periphery, or it may have a gearwheel on an shaft neck. The gearwheel 4 may have an end flange, flange surfaces, protrusions, shoulders, or cylindric surface to establish a fit and to connect to the drum cover. Rotational torque to drive the rope drum 1 may also be arranged through a spline shaft or gear coupler. In addition, through another power transmission member than a gearwheel, such as a spline shaft or gear coupler, which may also be considered belonging to the definition of a gearwheel defined in this application. The outer surface of the gearwheel 4 advantageously features a portion, in the axial direction, of a substantially smooth outer of inner cylindrical surface for establishing a fit with the drum cover 2 of the rope drum. The cylindrical outer surface may be used as a circumferential platform in the vicinity of the fastening point of the rope 3, and along this surface the rope may be led to the area of the rope cover 2 and further to a rope groove 5 in the drum cover 2. The diameter of the cylindrical outer surface is advantageously of the same magnitude as the outer surface of the drum cover 2 of the rope drum. Advantageously at least the portion of the teeth of the gearwheel 4 is heat treated.

The inventive fastening device 6 is in such a case fastenable on the circumferential area between the end surfaces of the rope drum 1, near an end of the rope drum 1, and protruding from its surface. This fastening device 6 mainly comprises a cylindrical gripping part 7 for installing a spliced rope loop 8 of the hoisting rope around it, and a fastening protrusion 10 arranged to extend from the top part of the cylindrical gripping part 7 over an end of the rope loop 8 and simultaneously forming, with the gripping part 7 and rope drum 1 periphery, a space 9 partly enclosing the end of the rope loop 8, the fastening protrusion extending transversely in relation to the axis of the rope drum 1 in the opposite direction than the hoisting rope 3 and comprising, after the space 9 for the end of the rope loop 8, a fastening area 11 for fastening to the rope drum 1.

The space 9 of the fastening device 6 has an open gap 9*a* whereby the rope loop 8, spliced and tested in advance under controlled conditions, may be threaded under the fastening device 6 in connection with its assembly. The space 9 is closed when the fastening device is fastened to the rope drum 1.

The aforementioned splicing refers threading the free end of the hoisting rope 3 through itself in the longitudinal direction, hiding the end inside the hoisting rope 3 over a distance of approximately 40 cm, for example. This technique is typically used when fastening a synthetic hoisting rope, which often has a very slippery surface. The spliced hoisting rope 3 is advantageously pretensioned prior to installing it to reduce its free stretch. A rope coming from the production line of a rope manufacturer is “loose”. When the rope is being tightened, it becomes tighter mainly radially and stretches mainly in the longitudinal direction. This stretch (of the 20% magnitude) is permanent. This is what the pretensioning is all about. The spliced portion of the hoisting rope is advantageously adapted to run on the area between the end of the rope drum 1 and the rope grooves 5 of the drum cover 2 along the cylindrical surface until the spliced portion narrows to the single thickness of the hoisting rope 3. After this, the hoisting rope is adapted to run on the surface of the drum cover to run along the rope groove. When the hoisting rope 3 has wound itself following the rope groove 5, the hoisting rope 5 may be guided from the rope drum 2, possibly through a guide of the hoisting rope 2, down to a hoisting member, usually a hook (not shown). The hoisting rope 5 is tied off back at the hoist or in some cases down at the hoisting member. The inventive fastening is advantageous for a synthetic hoisting rope, in particular. The invention could perhaps be applicable to a metal hoisting rope, too, if during splicing the end of the hoisting rope can be bent to a sufficiently small arc, or the rope end can be made a closed loop with one or more crimp barrels, for example, so that the loop does not interfere with the winding of the hoisting rope. The crimp barrel may possibly enclose an end of a steel rope at a first end, and a second end of the crimp barrel may have a fastening loop made of metal, for example.

In this inventive specification, the rope drum 1 comprises a rope groove 5 for the hoisting rope 3, circulating in a spiral-like manner the drum cover 2, whereby the rope drum 1 is meant for single-layer winding. Correspondingly, the cylindrical gripping part 7 comprises on its outer periphery a rope groove 12 whose cross section corresponds to the rope groove 5 of the rope drum 1.

The fastening device may also be used on a rope drum meant for mul-ti-layer winding, whereby the rope drum itself typically lacks a rope groove.

In the example shown in FIGS. 1 to 6, the gearwheel 4 is driven from the outer periphery of the rope drum 1 and forms part of the outer periphery of the rope drum 1, and the fastening device 6 for the hoisting rope is fastened to the gearwheel 4 adjacent to its toothing. Here, the fastening periphery 4*a* of the gearwheel 4 is located outermost on the periphery of the rope drum 1.

In the bore or space 18 made inside the cylindrical gripping part 7, a retaining pin 13 extending in the radial direction of the rope drum 1 and receiving shearing forces has been arranged, the retaining pin extending through the gearwheel 4 and partly inside the drum cover 2. The cylindrical gripping part 7 comprises a threaded hole 14 passing through its upper part for a release screw (not shown) meant for uncoupling the joint. The threaded hole 14 advantageously has the same thread size as the fastening screws 16 referred to next.

The fastening area 11 of the fastening device has fastening holes 15 for the fastening screws 16 or bolts of the fastening device. The fastening holes 15 are located successively in the longitudinal direction of the fastening device 6. The fastening screws 15 may be located in one or more rows in parallel. A one-row fastening is advantageous because it saves space in the direction of the shaft of the rope drum 1. In addition, adjacent to the fastening holes 15 or between the rows of fastening holes 15, there is a fin-like reinforcement 17 receiving the ten-sile force transmitted by the rope loop. In the most advantageous case, the cylindrical gripping part 7 and fastening protrusion 10 are of a uniform structure.

The retaining pin 13 is intended to be strained by a direct shearing stress, whereby its durability is the safest computationally and from the view-point of material selection. There are shearing points on the cylindrical surface of the rope drum 1 (on the surface of the drum cover 2 or gearwheel 4, depending on which one is outer) on the curved inner surface of the fastening device 6, and lower between the drum cover layer and material layer of the gearwheel 4. This latter shearing point for its part secures the press joint pressing in the radial direction in that area. The goal is to ensure the mutual non-rotability (that is, non-slipping) of the press joint layers (drum cover 2, gearwheel 4) of the rope drum 1, which is why the retaining pin 13 referred to is added. Reliable control of the press joint requires precise values in the joint area, such as surface coarseness, change in the radius achieved by means of heat, heating evenness circumferen-tially, friction coefficient etc, from which only approximate values are available, making it difficult to express the exact strength value.

The press joint of the rope drum 1, so between the drum cover 2 and gearwheel 4, must be carried out by advantageously heating the outer material layer. When there is a tempered gearwheel 4 in the connection area, a limited amount of heat may only be used. Correspondingly, tempering of the gearwheel 4 is easier to perform before the joint is assembled when the piece to be tempered is still smaller. Between the press joint of nested parts there is advantageously an axial collar against which the outer material to be heated is pushed.

Figure 7:
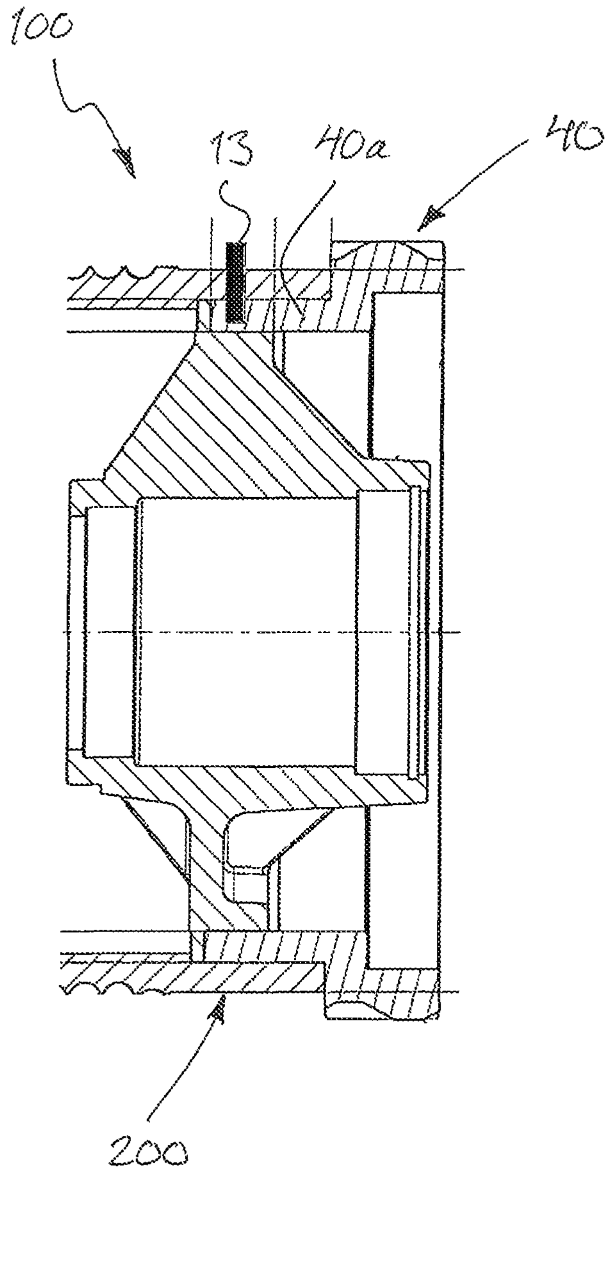
FIG. 7 shows a second fastening of the inventive fastening device.

In the embodiment of FIG. 7, the fastening periphery 40*a* of the gearwheel 40 is positioned, unlike what was described in the above, in the press joint inside the drum cover 200 The benefit of this structure is that a heat-treated gearwheel 40 need not be heated when a press fit is being assembled. In mutual positioning of the material layers, the part heat-treated at the previous work stages is selected to be the inner one. On the outer periphery, the teeth of the gearwheel 40 may have a larger periphery diameter, whereby the teeth are subjected to a weaker force in case the same rotational torque has been chosen. This implementation allows a hoist of a larger weight category than the previous implementation shown in FIGS. 1 to 6. In this structure the fastening device 6 (not shown) of the hoisting rope is meant to be fastened to the drum cover 200, and a retaining pin 13 extending in the radial direction of the rope drum 100 and receiving shearing forces is here, too, arranged inside the cylindrical gripping part 7, but the retaining pin now extends from the outside first through the drum cover 200 and then partly to the fastening periphery 40*a* of the gearwheel 40.

In both fastenings of the fastening device 6, which were described in the above, the bore reserved for the retaining pin 13 in the lowest material layer of the joint is somewhat short depth-wise, whereby the retaining pin 13 cannot fall inside the rope drum 1, 100.

When the spliced hoisting rope 3 has been fixed in place by means of the fastening device 6, it is adapted to run advantageously for at least some distance on the smooth cylindrical surface of the drum end before settling in the rope groove 5. From the point of view of the invention, the toothed periphery to run the rope drum may thus be positioned either inside or outside, and the order of the material layers at the shearing stress of the retaining pin 13 may be selected as desired.

The implementation of the fastening device 6 described in the above is based on the fastening device 6 being a hook-like device that has an open gap 9*a*. As a result, a premanufactured closed rope loop 8 may be brought in the gap 9*a*, and when the fastening device 6 is connected to the drum cover 1; 100 or gearwheel 4; 40, the gap 9*a* closes at the same time. Although not separately shown in the drawing, the fastening device 6 may also be made as a closed loop (usually of metal), in which case the hoisting rope for its part is tied by slicing only in connection with fastening to the rope drum and after fastening the fastening device 6. Alternatively, a fastening device 6 provided with a closed loop may be delivered to a fabrication cell which splices the rope for the uncoupled fastening device 6.

The above description of the invention is only intended to illustrate the basic idea of the invention. A person skilled in the art may, however, imple-ment its details within the scope of the attached claims.

The invention claimed is:

1. A rope drum of a rope hoist, having a drum cover for winding a hoisting rope around it, a power transmission member at one end of the drum cover for driving the rope drum, and a fastening device for fastening an end of the hoisting rope to the rope drum, wherein the fastening device:

is fastenable near an end of the rope drum on the area between end surfaces of the rope drum and protruding from its surface;

mainly comprises a cylindrical gripping part for installing a spliced rope loop of the hoisting rope around it, and a fastening protrusion arranged to extend from the cylindrical gripping part over the end of the rope loop and simultaneously forming a space partly enclosing the end of the rope loop, the fastening protrusion extending transversely in relation to the axis of the rope drum in the opposite direction than the hoisting rope and comprising a fastening area for fastening to the rope drum, wherein the power transmission member is a gearwheel, and wherein the gearwheel is driven from an outer periphery of the rope drum and forms part of the outer periphery of the rope drum, whereby the fastening device of the hoisting rope is fastened to the gearwheel, and inside the cylindrical gripping part a retaining pin extending in the radial direction of the rope drum and receiving shearing forces has been arranged, wherein the retaining pin extends through the gearwheel and partly inside the drum cover, or wherein the fastening device of the hoisting rope is fastened to the drum cover, and inside the cylindrical gripping part a retaining pin extending in the radial direction of the rope drum and receiving shearing forces has been arranged, wherein the retaining pin extends through the drum cover and partly inside the gearwheel.

2. The rope drum as claimed in claim 1, wherein the fastening protrusion extends from a top part of the cylindrical gripping part over the end of the rope loop and forms said space together with a periphery of the rope drum.

3. The rope drum as claimed in claim 1, wherein the hoisting rope is a synthetic rope.

4. The rope drum as claimed in claim 1, wherein the drum cover comprises a rope groove surrounding it in a spiral-like manner, for the hoisting rope.

5. The rope drum as claimed in claim 4, wherein the cylindrical gripping part comprises on its outer periphery a rope groove whose cross section corresponds to the rope groove of the rope drum cover.

6. The rope drum as claimed in claim 1, wherein the fastening area of the fastening device has fastening holes for fastening screws or bolts of the fastening device.

7. The rope drum as claimed in claim 1, wherein the cylindrical gripping part and the fastening protrusion are of a un-uniform structure.

8. A fastening device for fastening an end of a hoisting rope to a rope drum of a rope hoist in an area between its end surfaces close to an end of the rope drum, wherein it mainly comprises a cylindrical gripping part for installing a spliced rope loop of the hoisting rope around it, and a fastening protrusion arranged to extend from the cylindrical gripping part over an end of the rope loop and simultaneously forming a space partly enclosing the end of the rope loop, the fastening protrusion comprising a fastening area for fastening to the rope drum, wherein inside the cylindrical gripping part a retaining pin extending in the radial direction of the rope drum and receiving shearing forces has been arranged, the retaining pin extending either through the gearwheel at the end of the rope drum or through the drum cover.

9. The fastening device as claimed in claim 8, wherein the fastening protrusion extends from a top part of the cylindrical gripping part over the end of the rope loop and forms said space together with a periphery of the rope drum.

10. The fastening device as claimed in claim 8, wherein the cylindrical gripping part comprises a rope groove on its outer periphery.

11. The fastening device as claimed in claim 8, wherein the fastening area of the fastening device has fastening holes for fastening screws or bolts of the fastening device.

12. The fastening device as claimed in claim 11, wherein the fastening holes of the fastening device are located successively in one or more rows in the longitudinal direction of the fastening device.

13. The fastening device as claimed in claim 8, wherein the cylindrical gripping part and fastening protrusion are of a uniform structure.

14. A rope drum of a rope hoist, having a drum cover for winding a hoisting rope around it, a power transmission member at one end of the drum cover for driving the rope drum, and a fastening device for fastening an end of the hoisting rope to the rope drum, wherein the fastening device:

is fastenable near an end of the rope drum on the area between the end surfaces of the rope drum and protruding from its surface; and, mainly comprises a cylindrical gripping part for installing a spliced rope loop of the hoisting rope around it, and a fastening protrusion arranged to extend from the cylindrical gripping part over the end of the rope loop and simultaneously forming a space partly enclosing the end of the rope loop, the fastening protrusion extending transversely in relation to the axis of the rope drum in the opposite direction than the hoisting rope and comprising a fastening area for fastening to the rope drum, wherein the fastening area of the fastening device has fastening holes for fastening screws or bolts of the fastening device.

* * * * *